(12) United States Patent
Kim

(10) Patent No.: US 6,749,883 B2
(45) Date of Patent: Jun. 15, 2004

(54) PROCESS OF BEAK-NUN-CHO WHITE KIMCHI FOR STAMINA

(75) Inventor: Soon Ja Kim, Bucheon (KR)

(73) Assignee: Han Seung Food Co., Ltd., Kyungki-Do (KR)

( * ) Notice: Subject to any disclaimer, the term of this patent is extended or adjusted under 35 U.S.C. 154(b) by 212 days.

(21) Appl. No.: 10/031,470

(22) PCT Filed: Feb. 5, 2001

(86) PCT No.: PCT/KR01/00160

§ 371 (c)(1), (2), (4) Date: Jun. 10, 2002

(87) PCT Pub. No.: WO01/87078

PCT Pub. Date: Nov. 22, 2001

(65) Prior Publication Data

US 2002/0182304 A1 Dec. 5, 2002

(30) Foreign Application Priority Data

May 16, 2000 (KR) .......................................... 2000-26152

(51) Int. Cl.⁷ ............................................... A23L 1/212
(52) U.S. Cl. ........................ 426/615; 426/506; 426/638
(58) Field of Search ................................ 426/615, 638, 426/506

(56) References Cited

U.S. PATENT DOCUMENTS 5,869,116 A    2/1999   Yoo

FOREIGN PATENT DOCUMENTS

| JP | 59-91856 | 5/1984 |
|---|---|---|
| JP | 7213225 A2 | 8/1995 |
| KR | 10-1994-028693 | 11/1994 |
| KR | 10-999-0055751 | 12/1999 |
| KR | 1002727560000 | * 8/2002 |

* cited by examiner

Primary Examiner—Helen Pratt

(57) ABSTRACT

Disclosed is a method for preparing health-aid white kimchi containing *Opuntia ficus midia*. About 51.5 parts by weight of half-cut Chinese cabbages whose outer leaves are trimmed off are immersed in about 8% saline for about 12 hours and rinsed with water, followed by dewatering. About 9.3 parts by weight of radish is cut into segments, and mixed with about 1 part by weight of clove onion pieces about 4 cm long, about 1 part by weight of dropwort stem pieces about 4 cm long, about 3 parts by weight of apple pieces, about 3 parts by weight of pear pieces, about 0.5 part by weight of chestnut pieces, about 2 parts by weight of carrot pieces, about 2 parts by weight of onion pieces, about 0.5 part by weight of *Opuntia ficus midia* pieces about 0.2 mm thick, about 0.1 part by weight of red pepper sections about 0.3 cm thick, about 0.3 part by weight of jujube flesh slices, about 3 parts by weight of crushed garlic, and about 1 part by weight of crushed ginger, along with about 0.3 part by weight of salt. The resulting radish segment mass is applied to each leaf of the cabbage, after which the cabbage is wrapped with its outer leaves and soaked in soused water. The white kimchi is beneficial to the health of the body owing to its containing *Opuntia ficus midia*, and has a good flavor, thereby making a contribution to an improvement in the national diet, as well as becoming a globalized food.

20 Claims, No Drawings

PROCESS OF BEAK-NUN-CHO WHITE KIMCHI FOR STAMINA

TECHNICAL FIELD

The present invention relates to a method for preparing white kimchi which employs *Opuntia ficus midia*, apple, pear, chestnut, and carrot as main materials. More particularly, the present invention relates to an improvement in flavor and nutrition, along with the method.

BACKGROUND OF THE INVENTION

*Opuntia ficus midia*, a kind of cactus, grows naturally in Cheju Island, Korea According to various Chinese traditional pharmacological literature, including "Bencao gangmu" (meaning "The Great Pharmacopoeia"), *Opuntia ficus midia* is described to be effective for the treatment of asthma, cough, pulmonary disorders, gastritis, constipation, enteritis, nephritis, hypertension, diabetes mellitus, heart diseases, neuralgia, arthritis, tumors, abscesses, dysentery, etc.

Being rich in vitamin C, *Opuntia ficus midia* is known to be beneficial to dermal aesthetics. In Korea, this plant has been used as a folk remedy for constipation and difficulty in urination, and to activate functions of the gastric and intestinal tracts and improve appetite. In addition, its leaves have been used for the treatment of various dermal diseases, including burns.

Currently, only very few foods utilizing *Opuntia ficus midia*, except for tea applications, are found.

White kimchi, a kind of kimchi, is characterized in that it is white, unlike general kimchi, which red in color. No red pepper powders, a small quantity of condiments, and affluent juice are characteristic of white kimchi. Generally, this kimchi has a light and fresh taste which becomes more rich in winter. In cold regions of Korea, the juice of white kimchi is used as a noodle broth.

DISCLOSURE OF THE INVENTION

Therefore, it is an object of the present invention to provide a method for preparing white kimchi, which is rich in nutrients and improved in flavor and taste.

Based on the present invention, the above object could be accomplished by a provision of a method for preparing health-promoting white kimchi, in which a condiment mass prepared from radish, apple, pear, chestnut, carrot, onion, jujube, red pepper, clove onion, dropwort, *Opuntia ficus midia*, garlic and ginger is applied to each leaf of marinated Chinese cabbage, and the seasoned cabbage is garnished with pine nuts and soaked in salt water.

SUMMARY OF THE INVENTION

According to the present invention, there is provided a use of *Opuntia ficus midia* in the preparation of white kimchi.

First, materials for kimchi are prepared. Chinese cabbage is trimmed by nipping off its outer leaves and cut into two halves. These segments are submerged in salt solution and then rinsed with flowing water, followed by dewatering. The next step is preparation of condiments for white kimchi. Condiments useful in the present invention comprise radish, clove onion, dropwort, apples, pears, chestnuts, carrots, onions, *Opuntia ficus midia*, jujube, red pepper, garlic and ginger. Radish, clove onion, dropwort and *Opuntia ficus midia* are separately cut into segments of a suitable size. This cutting may be conducted manually or mechanically. As for dropwort, its stem alone is used. Apples, pears, chestnuts, carrots and onions are cut into small pieces. After being deprived of its seed, jujube is sliced thinly. Red pepper is also sectioned at a sutible length and removed of its seeds. Garlic and ginger are crushed. These condiments are mixed together, along with salt.

Thereafter, the resulting prepared condiment mass is intermittently layered on individual leaves of the marinated cabbage, which is then wrapped in its outer leaves in order to restrain the leakage of the condiments and garnished with pine nuts, followed by immersion in salt water.

Preferably, the Chinese cabbages are those which are produced in winter.

In addition to *Opuntia ficus midia*, kimchi materials used in the present invention make the white kimchi very rich in nutrition and improved in flavor. For example, apples provide various vitamins and inorganic elements. Pears are known to have the function of counteracting poisons. Rich in proteins, carbohydrates and minerals, chestnuts are effective for the invigoration of the stomach. Carrot is very rich in vitamins and carotenes. Sulfides of onion are disclosed to regulate blood sugar levels and be of anti-cancer activity. Accordingly, the white kimchi makes a contribution to the health of the body.

DETAILED DESCRIPTION OF THE INVENTION

Chinese cabbage is trimmed by nipping off its outer leaves and cut into two halves. These segments are submerged in about 8% salt solution for about 12 hours and then rinsed about three or four times with flowing water, followed by dewatering.

Based on about 51.5 parts by weight of Chinese cabbage, it is preferred that the radish segments are used at an amount of about 9.3 parts by weight, the clove onion pieces at an amount of about 1 part by weight, the dropwort stem pieces at an amount of about 1 part by weight, the *Opuntia ficus midia* pieces at an amount of about 0.5 part by weight, the apple pieces at an amount of about 3 parts by weight, the pear pieces at an amount of about 3 parts by weight, the chestnut pieces at an amount of about 0.5 part by weight, the carrot pieces at an amount of about 2 parts by weight, the onion pieces at an amount of about 2 parts by weight, the jujube pieces at an amount of about 0.3 part by weight, the red pepper sections at an amount of about 0.1 part by weight, the crushed garlic at an amount of about 3 parts by weight, and the crushed ginger at an amount of about 1 part by weight. When mixing the condiments, salt is used at an amount of about 0.3 part by weight. As a garnish for the white kimchi, about 0.5 part by weight of pine nuts is used. Also, the white kimchi is soaked in about 20 parts by weight of the salt water.

PREFERRED EMBODIMENTS

In one embodiment of the present invention, 51.5 parts by weight of half-cut Chinese cabbages whose outer leaves are trimmed off are immersed in a 8% saline for 12 hours and rinsed 3 to 4 times with water, followed by dewatering. 9.3 parts by weight of radish is cut into segments. Separately, 1 part by weight of clove onion and 1 part by weight of a dropwort stem are cut into pieces, each being 4 cm long. 3 parts by weight of apples, 3 parts by weight of pears, 0.5 part by weight of chestnuts, 2 parts by weight of carrots and 2 parts by weight of onion are also cut into small pieces. 0.5 part by weight of *Opuntia ficus midia* is cut into pieces 0.2 mm thick. After being removed of its seed, 0.3 part by weight of a jujube fruit is sliced. 0.1 part by weight of red pepper is sectioned at a thickness of 0.3 cm and removed of seeds. 3 parts by weight of garlic and 1 part by weight of ginger are crushed. The condiments are mixed together and added with 0.3 part by weight of salt. The resulting condiment mass is applied to each leaf of the cabbage which is then wrapped with its outer leaves and garnished with 0.5 part by weight of pine nuts. The cabbage is placed in 20 parts by weight of salt water.

For sensory test, the white kimchi was tasted by 40 skilled subjects (20 males and 20 females). 36 of them replied that it was delicious, while the others said its taste was average. To the question concerning texture, 37 subjects replied good and the remaining 3 subjects answered "not bad and not good". Accordingly, the white kimchi prepared according to the present invention was evaluated to be better both in flavor and in freshness and texture than conventional white kimchi.

In addition, when the subjects were asked whether the kimchi of the present invention was able to become a favorite food of the general public, 36 of them said "high probability" while 4 subjects said "moderate probability".

With the medicinal benefit and the good flavor and taste, the white kimchi prepared according to the present invention is believed to make a contribution to an improvement in the national diet, as well as becoming a globalized food.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

As described hereinbefore, the present invention provides white kimchi which is useful as a health food using the medicinally effective *Opuntia ficus midia* and is improved in flavor. With these advantages, the cabbage kimchi can become a globalized food.

What is claimed is:

1. A method for preparing health-promoting white kimchi, in which a condiment mass prepared from radish, apple, pear, chestnut, carrot, onion, jujube, red pepper, clove onion, dropwort, *Opuntia ficus midia*, garlic and ginger is applied to each leaf of marinated Chinese cabbage, and the seasoned cabbage is garnished with pine nuts and soaked in salt water.

2. The method as set forth in claim 1, wherein said Chinese cabbage is trimmed, cut into two halves, immersed in about 8% salt solution for about 12 hours, rinsed and dewatered.

3. The method as set forth in claim 1, wherein the condiment mass is prepared by mixing about 9.3 parts by weight of radish segments with about 1 part by weight of clove onion pieces about 4 cm long, about 1 part by weight of dropwort stem pieces about 4 cm long, about 3 parts by weight of apple pieces about 3 parts by weight of pear pieces, about 0.5 part by weight of chestnut pieces, about 2 parts by weight of carrot pieces, about 2 parts by weight of onion pieces, about 0.5 part by weight of *Opuntia ficus midia* pieces about 0.2 mm thick, about 0.1 part by weight of red pepper sections, about 0.3 cm thick, removed of seeds, about 0.3 part by weight of jujube flesh slices, about 3 parts by weight of crushed garlic, and about 1 part by weight of crushed ginger, along with about 0.3 part by weight of salt, and said about 1 part by weight of crushed ginger, along with about 0.3 part by weight of salt, and said prepared condiment mass is applied to each leaf of about 51.5 parts by weight of the cabbage, and the cabbage is wrapped with its outer leaves, garnished with about 1.5 part by weight of pine nuts, and soaked in about 20 parts by weight of water.

4. White kimchi, comprising Chinese cabbage soaked in salt water with a condiment made of one or more selected from the group consisting of radish, apple, pear, chestnut, carrot, onion, jujube, red pepper, clove onion, dropwort, garlic and ginger, wherein the white kimchi further comprises pieces of *Opuntia ficus midia*.

5. A method for making white Kimchi, comprising:
   providing Chinese cabbage;
   preparing a condiment comprising pieces of *Opuntia ficus midia*;
   applying the condiment to the Chinese cabbage; and
   soaking the Chinese cabbage with the condiment in an aqueous solution.

6. The method of claim 5, wherein the providing Chinese cabbage comprises soaking the Chinese cabbage in a salt solution for a period of time.

7. The method of claim 6, wherein the salt solution comprises about 8 wt. % of salt.

8. The method of claim 6, wherein the period is about 12 hours.

9. The method of claim 6, wherein the Chinese cabbage soaked in the salt solution is rinsed and dewatered.

10. The method of claim 5, wherein the condiment is applied to each leaf of the Chinese cabbage.

11. The method of claim 5, wherein the condiment further comprises salt.

12. The method of claim 5, wherein the condiment further comprises one or more selected from the group consisting of radish, apple, pear, chestnut, carrot, onion, jujube, red pepper, clove onion, dropwort, garlic and ginger.

13. The method of claim 12, wherein the preparation of the condiment comprises providing and mixing pieces of one or more components thereof.

14. The method of claim 12, wherein the condiment comprises about 9.3 parts by weight of pieces of radish, about 1 part by weight of clove onion pieces, about 1 part by weight of dropwort stem pieces, about 3 parts by weight of apple pieces, about 3 parts by weight of pear pieces, about 0.5 part by weight of chestnut pieces, about 2 parts by weight of carrot pieces, about 2 parts by weight of onion pieces, about 0.5 part by weight of *Opuntia ficus midia* pieces, about 0.1 part by weight of red pepper pieces, about 0.3 part by weight of jujube flesh slices, about 3 parts by weight of crushed garlic, about 1 part by weight of crushed ginger, and about 0.3 part by weight of salt.

15. The method of claim 14, wherein the condiment is applied to about 51.5 parts by weight of the cabbage.

16. The method of claim 14, wherein the clove onion pieces are about 4 cm long, the dropwort stem pieces are about 4 cm long, the *Opuntia ficus midia* pieces are about 0.2 mm thick, and the red pepper pieces are about 0.3 cm thick.

17. The method of claim 5, wherein the aqueous solution comprises salt dissolved therein.

18. The method of claim 5, wherein about 51.5 parts by weight of the cabbage are soaked in about 20 parts by weight of the aqueous solution.

19. The method of claim 5, further comprising adding pine nuts to the cabbage soaked in the aqueous solution.

20. The method of claim 19, wherein about 1.5 parts by weight of the pine nuts are added.

* * * * *